United States Patent
Jäckel et al.

(10) Patent No.: US 6,712,706 B2
(45) Date of Patent: Mar. 30, 2004

(54) ARRANGEMENT FOR DAMPING TORSIONAL VIBRATIONS

(75) Inventors: Johann Jäckel, Bühlertal (DE); Hartmut Mende, Bühl (DE); Michael Bosse, Sinzheim (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 65 days.

(21) Appl. No.: 10/098,749

(22) Filed: Mar. 14, 2002

(65) Prior Publication Data

US 2002/0147051 A1 Oct. 10, 2002

(30) Foreign Application Priority Data

Mar. 14, 2001 (DE) .......................... 101 12 047

(51) Int. Cl.⁷ ................................. F16D 3/14
(52) U.S. Cl. ..................... 464/68; 192/214.1
(58) Field of Search ................ 192/214.1, 212; 74/574; 464/68

(56) References Cited

U.S. PATENT DOCUMENTS

| | | | |
|---|---|---|---|
| 5,092,820 A | * 3/1992 | Naudin et al. | 464/68 |
| 5,218,884 A | * 6/1993 | Rohrle | 74/574 |
| 5,261,516 A | 11/1993 | Friedmann | |
| 5,289,737 A | * 3/1994 | Kuhne | 74/574 |
| 5,310,267 A | 5/1994 | Jackel et al. | |
| 5,622,245 A | 4/1997 | Reik et al. | |
| 5,642,875 A | 7/1997 | Albers et al. | |
| 5,681,221 A | 10/1997 | Albers et al. | |
| 6,131,487 A | 10/2000 | Jackel et al. | |
| 6,217,451 B1 | 4/2001 | Kooy et al. | |
| 6,371,857 B1 | * 4/2002 | Kono et al. | 464/68 |
| 6,547,227 B1 | 4/2003 | Mende | |

FOREIGN PATENT DOCUMENTS

| | | |
|---|---|---|
| DE | 41 17 582 | 12/1991 |
| DE | 42 14 655 | 12/1992 |
| DE | 42 29 416 | 3/1993 |
| DE | 44 06 826 | 9/1994 |
| DE | 44 14 584 | 11/1994 |
| DE | 44 20 927 | 12/1994 |
| DE | 195 22 718 | 1/1996 |
| DE | 196 03 248 | 8/1996 |
| DE | 196 48 342 | 6/1997 |
| DE | 199 09 044 | 9/1999 |
| DE | 199 12 970 | 9/1999 |

* cited by examiner

*Primary Examiner*—Lynne H. Browne
*Assistant Examiner*—Kenn Thompson
(74) *Attorney, Agent, or Firm*—Darby & Darby

(57) ABSTRACT

The coaxial first and second flywheels of a torsional vibration damper, e.g., in the power train of a motor vehicle, are rotatable relative to each other against the opposition of one or more arcuate coil springs which is or are confined in an annular chamber defined by at least one of the flywheels. One end of the coil spring or each coil spring bears, directly, or indirectly, against a single retainer or against one of several discrete retainers on one of the flywheels, and the other end of the coil spring or each coil spring bears, directly or indirectly, against a single retainer or against one of several discrete retainers of the other flywheel. At least one slide is interposed between the radially outermost portions of discrete convolutions provided between an internal surface of the at least one flywheel and one or more discrete coil springs, one for each slide. The slides are clamped to selected convolutions of the respective coil springs against lengthwise and/or radial movement away from the respective coil spring or springs.

31 Claims, 2 Drawing Sheets

ARRANGEMENT FOR DAMPING TORSIONAL VIBRATIONS

CROSS-REFERENCE TO RELATED CASES

This application claims the priority of commonly owned copending German patent application Serial No. 101 12 047.8 filed Mar. 14, 2001. The disclosure of the aforementioned copending German patent application, as well as that of each US and foreign patent and patent application identified in the specification of the present application, is incorporated herein by reference.

BACKGROUND OF THE INVENTION

The present invention relates to improvements in arrangements for damping torsional vibrations, especially for use in the power trains of motor vehicles, and more particularly to improvements in torsional vibration dampers of the type wherein at least two coaxial components, e.g., two flywheels, are rotatable with and relative to each other against the opposition or resistance of one or more resilient elements, such as coil springs. Still more particularly, the instant invention relates to improvements in torsional vibration dampers (hereinafter also called dampers for short) of the character wherein at least one of the components defines one or more chambers or compartments for one or more preferably arcuate coil springs each of which bears upon a first retainer provided on one of the components and reacts against a second retainer provided on another component. At least that surface or those surfaces which surrounds or surround the chamber or chambers radially outwardly of and lengthwise of the coil spring(s) serves or serve to limit the extent of movement of the coil spring or springs, e.g., under the action of centrifugal force.

Torsional vibration dampers of the above outlined character are disclosed, for example, in published German patent applications Nos. 4 117 582, 4 214 655, 4 414 584, 4 420 927 and 195 22 718.

Reference may also be had to commonly owned copending patent application Ser. No. 10/094,503 filed Mar. 8, 2002 by Johann Jackel et al. for "Torsional Vibration Damper".

OBJECTS OF THE INVENTION

An object of our invention is to provide a torsional vibration damper which is more reliable, simpler and more effective than heretofore known torsional vibration dampers.

Another object of the present invention is to provide a torsional vibration damper which is less expensive than heretofore known dampers.

A further object of this invention is to provide a torsional vibration damper which can be assembled and installed, e.g., in the power train of a motor vehicle, in a simple and time-saving manner.

An additional object of the instant invention is to provide a torsional vibration damper with one or more coil springs or analogous energy storing units or assemblies which can perform their intended functions in an optimal manner not only at relatively low but also at higher and very high rotational speeds of the damper.

Still another object of the invention is to provide novel and improved energy storing means, particularly for use in torsional vibration dampers of the above outlined character.

A further object of the invention is to provide a novel and improved method of reducing or eliminating friction between the housing and the energy storing means in a torsional vibration damper of the above outlined character.

Another object of the present invention is to provide a power train which can be utilized with advantage in motor vehicles and which employs one or more torsional vibration dampers of the above outlined character.

An additional object of our invention is to provide a novel and improved combination of a torsional vibration damper and a friction clutch, particularly for use between the prime mover and the change-speed transmission in the power train of a motor vehicle.

SUMMARY OF THE INVENTION

Our invention resides in the provision of a torsional vibration damper which comprises a first component which is rotatable (e.g., by the prime mover in the power train of a motor vehicle) about a predetermined axis, and a second component which is rotatable about the predetermined axis with and relative to the first component. At least one of the components defines an arcuate chamber which is bounded by an internal surface of the at least one component, and the improved damper further comprises at least one energy storing unit which includes an elongated coil spring disposed in the arcuate chamber and serving to oppose rotation of the components relative to each other. The coil spring has a plurality of convolutions, a first end which bears upon a retainer of the first component (either directly or indirectly), a second end which reacts (directly or indirectly) against a retainer of the second component, and an intermediate portion between its ends. The at least one component includes a wall having an inner surface which forms part of the internal surface, which is disposed radially outwardly of the at least one coil spring and which extends circumferentially of the coil spring at least between the aforementioned ends of such spring. The damper further comprises friction reducing means including at least one slide which is interposed between the inner surface of the wall and the coil spring. The slide has an outer side which is adjacent the inner surface of the wall and the slide overlies at least one convolution of the coil spring. A radially outermost portion of the at least one convolution (namely the portion which is nearest to the inner surface of the wall) is engaged by at least one portion of the slide in such a way that the connection (a) prevents movements of the slide and the at least one convolution relative to each other longitudinally of the coil spring and (b) opposes movements of the slide and the at least one convolution relative to each other at least substantially radially of the common axis of the first and second components.

The components of the improved torsional vibration damper can form part of the power train in a motor vehicle. For example, one of the components can be rotated by the output shaft of an internal combustion engine, and the other component can serve to rotate the input shaft of a change-speed transmission in response to engagement of the friction clutch.

The at least one portion of the slide can be in form-locking and/or in force-locking engagement with a part of the outermost portion of the aforementioned at least one convolution of the coil spring.

The engagement between the slide and the at least one convolution of the coil spring can serve to oppose or prevent movements of these parts relative to each other only radially of the common axis of the components or only lengthwise of the coil spring.

It is often advisable to establish between the slide and the coil spring a connection which gives the at least one convolution of the spring limited freedom of pivotal movement with respect to the aforementioned at least one portion of the slide. For example, the extent of such pivotal movement can be in the range of between about 2° and 10°.

In many or most instances, the convolutions of the coil spring consist of round wire, and the aforementioned portion of the slide can partially surround as well as extend lengthwise of the wire of the at least one convolution of the coil spring. The arrangement can be such that a median part of the aforementioned portion of the slide contacts the wire without any play or without appreciable play and two outer parts of such portion of the slide surround the wire with clearances or plays which increase in directions lengthwise of the wire and away from the median part.

The slide can further comprise at least one extension which projects from the at least one portion of the slide and lengthwise of the coil spring. It is presently preferred to design the slide in such a way that it comprises two extensions which flank the at least one portion of the slide and extend lengthwise of the coil spring toward the respective ends of the latter. Each extension can have an at least substantially wedge-shaped cross-sectional outline and the cross-sectional area of each extension preferably decreases with increasing distance from the at least one portion of the slide.

The entire slide can be made of a single piece of a suitable material, e.g., a plastic material. Alternatively, the slide can include a main part and the at least one portion of the slide can include or constitute a separately produced second part which is affixed to the main part. The second part can be at least substantially U-shaped and can include two resilient legs which clamp the outermost portion of the at least one convolution of the coil spring. The second part of the slide can consist, either in part or entirely, of spring steel. It is often preferred to design the second part in such a way that it can be secured to the at least one convolution of the coil spring by snap action.

The slide can have an arcuate shape and can overlie one, two or more neighboring convolutions of the coil spring. In a cross-sectional view, the slide can be U-shaped and can overlie one or more convolutions along an arc of 90° or more, e.g., along an arc of at least 180°.

The coil spring can extend along an arc of at least 90°, e.g., it can occupy at least one fourth of the annular chamber. Furthermore, the friction reducing means can include a plurality of discrete slides.

The components of the improved torsional vibration damper can constitute discrete flywheels of a composite flywheel. As already mentioned hereinbefore, one of the components can normally receive torque from the prime mover of a motor vehicle and the other component can transmit torque to the input element (such as a shaft) of a change-speed transmission in the power train of the motor vehicle.

The aforementioned chamber can constitute a circumferentially complete annular chamber, and the damper can comprise at least one second energy storing unit in the chamber. Each unit can comprise several coil springs which are disposed end-to-end (i.e., in series) or a pair of interfitted coil springs (i.e., a smaller-diameter coil spring fitted into a larger-diameter coil spring.

The novel features which are considered as characteristic of the invention are set forth in particular in the appended claims. The improved torsional vibration damping arrangement itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
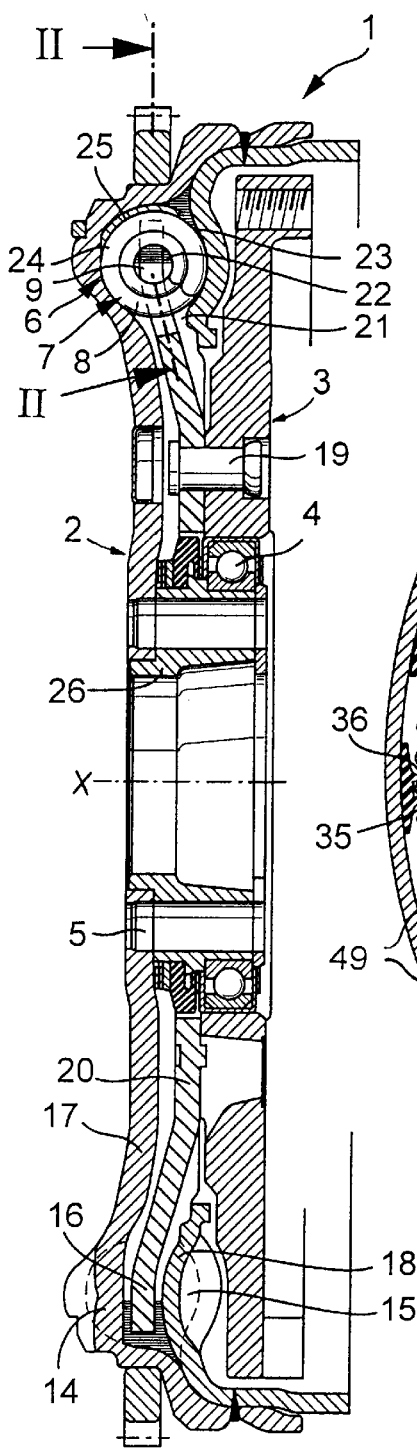
FIG. 1 is an axial sectional view of a torsional vibration damping arrangement which constitutes a composite flywheel and embodies one presently preferred form of our invention.
Figure 2:
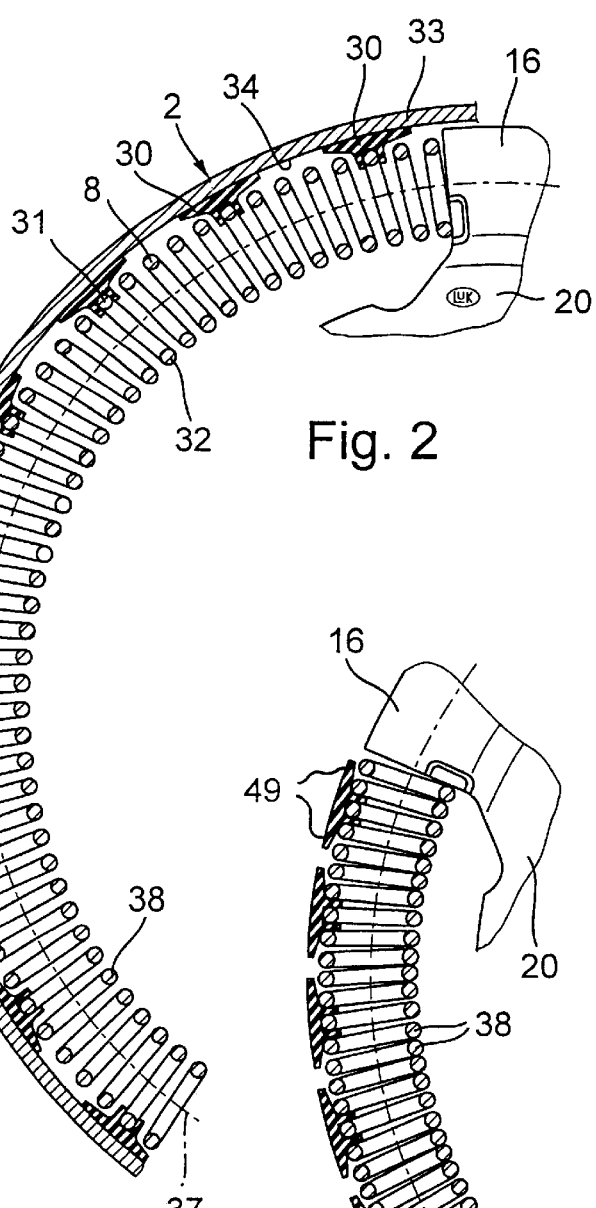
FIG. 2 is a fragmentary sectional view of the torsional vibration damping arrangement as seen in the direction of arrows from the line II—II in FIG. 1, an arcuate coil spring of the damping arrangement being shown in unstressed or partially stressed condition in which the radially innermost portions of all of its convolutions are spaced apart from each other.

Referring to FIGS. 1 and 2, there is shown a torsional vibration damper 1 which is a composite fly-wheel and is assumed to be mounted in the power train of a motor vehicle including a prime mover, such as an internal combustion engine having a rotary output element (e.g., a camshaft or a crankshaft) serving to drive a first rotary component 2 (primary flywheel) of the damper 1. The output element of the prime mover is affixed to the component 2 by a set of bolts or analogous fasteners, not shown, extending through holes 5 provided in a central portion 26 of the component 2. The illustrated central portion 26 is a hub which surrounds the input shaft (not shown) of the change-speed transmission in the power train.

The damper 1 further comprises a second rotary component (secondary flywheel) which, in the embodiment of FIGS. 1 and 2, is assembled of two parts, namely a shell 3 and at least one washer-like part 20 riveted (at 19) to the shell 3. The shell 3 can constitute the counterpressure plate of an engageable and disengageable friction clutch which, when engaged, serves to transmit torque between the aforementioned output element of the prime mover and the input shaft of the transmission.

The components 2 and 3, 20 of the damper 1 are rotatable with and relative to each other about a common axis X. An antifriction ball bearing 4 is interposed between the hub 26 of the component 2 and the radially innermost portion of the shell 3 of the secondary fly-wheel (second component) of the composite flywheel constituting the damper 1. The component 2 has one or more first retainers 14, 15 (only one is shown in FIG. 1) which cooperates or cooperate with one or more retainers 16 provided on the washer-like part 20 to stress or to relax the bias of a resilient energy storing unit 6 including one, two or more pairs of arcuate coil springs 8, 9 of finite length. One end convolution of the coil spring 8 bears upon the retainer 14, 15 of the component 2 and the other end convolution of such coil spring reacts against the retainer 16 of the part 20 of the composite second component 3, 20. The coil spring 9 is at least partially confined in the coil spring 8.

The coil spring 9 is or can be shorter than the coil spring 8. For example, the length of the coil spring 8 can exceed that of the coil spring 9 by 15–60 degrees (preferably by 30–50 degrees) or even more or even less.

The radially outermost portion 24 of a first section 17 of the component 2 cooperates with the radially outermost portion 23 of a second section 18 of the component 2 to define an annular or arcuate chamber 34 bounded by the internal surfaces 22, 21 of the portions 24, 23 and receiving the coil springs 8 and 9. The chamber 34 can contain a supply 7 of lubricant, e.g., grease. The radially outermost portion of the washer-like part 20 extends radially outwardly and into the chamber 34 to serve as the retainer 16 for one end convolution 32 of the coil spring 8 (see FIG. 2). The component 2 is or can be made of metallic sheet stock and its retainer 14, 15 is constituted by deformed end portions of its welded-together sections 17 and 18.

When the output shaft of the engine drives the component 2, the composite retainer 14, 15 of sections 17, 18 of this component bears upon the adjacent end convolution 32 of the coil spring 8 so that the latter stores energy or at a certain stage stores energy which is necessary to transmit torque to and to turn the component 3, 20. If the friction clutch of the power train is engaged, or is engaged to a certain extent, the component 3, 20 rotates the clutch disc (not shown) of the friction clutch and the clutch disc rotates the input shaft of the change-speed transmission. Reference may be had, for example, to FIG. 1 of commonly owned U.S. Pat. No. 5,980,386 granted Nov. 9, 1999 to Friedmann et al. for "APPARATUS FOR DAMPING VIBRATIONS" where-in the character 3 denotes a first component, the character 41 denotes a washer-like part of a second component, the character 9 denotes the clutch disc, of a friction clutch 1, and the character 10 denotes the input shaft of the change-speed transmission.

The retainer 16 can constitute a radially outwardly extending arm of the washer-like part 20 of the second component 3, 20. The section 17 of the component 2 can constitute a converted (such as cold formed) sheet metal blank and serves to secure the component 2, and hence the entire torsional vibration damper, to the output shaft of the engine. The part 20 preferably also consists of sheet metal and is cold formed or otherwise deformed to exhibit the portion 15 of the composite retainer 14, 15 of the component 2. The deformed radially outer portions 24, 23 of the sections 17, 18 define the aforementioned annular chamber 34 (FIG. 2) for the coil springs 8 and 9 and the retainers 14–15, 16.

The chamber 34 has a toroidal shape and at least a portion thereof is preferably filled with lubricant 7 (such as grease) for the energy storing unit 6 of the damper 1. The portions 24, 23 of the sections 17, 18 can further serve as a guide means for the convolutions or for certain convolutions 32 of the outer coil spring 8 and as a means for limiting lateral displacements of such convolutions when the spring 8 is caused to store energy as a result of angular movements of the component 2 relative to the component 3, 20 and/or vice versa.

At least when the engine drives the damper 1, the convolutions of the coil spring 8 are acted upon by centrifugal force and move or tend to move radially outwardly (i.e., away from the common axis X of the components 2 and 3, 20) against the radially outwardly adjacent portions 23, 24 of the sections 17, 18, i.e., against the internal surfaces 21 and 22. The extent of wear upon the sections 17, 18 and/or upon the convolutions of the coil spring 8 can be reduced (even to zero) by resorting to one or more suitable friction-resistant inserts 25 which are borne by the sections 17, 18 of the component 2 and are radially outwardly adjacent the convolutions of the coil spring 8. Reference may be had, for example, to FIG. 9 of the aforementioned commonly owned U.S. Pat. No. 5,980,386 to Friedmann et al. Such insert or inserts can be made of hardened metallic sheet material. In addition to preventing wear upon certain adjacent parts and/or in addition to reducing wear upon certain additional parts, the insert or inserts 25 can also serve as a means for frictionally damping undesirable stray movements of parts which are in contact there-with and which move relative to each other and/or relative to the inserts when the component 2 turns relative to the component 3, 20 and/or vice versa. The magnitude or extent of frictional damping action is a function of the RPM of the damper 1 and of compression of the energy storing unit or units 6 each of which includes a coil spring and, if necessary, a coil spring 9 confined in the respective spring 8.

The wear-resistant insert or inserts 25 can extend lengthwise of the radially outer portion of the entire unstressed coil spring 8 or of the radially outer portion of each of two or more coil springs 8 or lengthwise of the entire annular chamber 34. When the coil spring 8 which is shown in FIG. 1 is subjected to the action of centrifugal force in response to rotation of the components 2 and 3, 20 about their common axis X, the coil spring 8 tends to move radially outwardly toward or actually engages the internal surface of the insert 25.

Owing to friction which develops between the convolutions of the coil spring 8 and the insert 25, the tensioning of the coil spring 8 decreases only slightly (i.e., insufficiently), especially if the damper 1 is rotated at a high speed. This can affect (lower) the quality of damping action of the damper 1, especially when the operator of the motor vehicle embodying the damper 1 decides to switch from operation with pull to operation with push (coasting) and/or vice versa. This can entail the generation of pronounced noise which is unpleasant to the operator as well as to other occupant(s) of the vehicle. Under such circumstances, the energy storing unit 6 including the pair or pairs of coil springs 8 and 9 acts as a relatively hard stop due to the fact that the convolutions of the coil spring 8 are at least partially tensioned (owing to friction with the insert 25) and thus exhibit a pronounced stiffness.

In order to avoid the just discussed problems, i.e., to greatly reduce the tensioning of the energy storing unit 6, and especially to at least reduce the tensioning of the coil spring 8, it is now proposed to employ one or more friction reducing slides or shoes 30 which can be of the type shown in FIGS. 2–6. Each slide 30 is affixed to a part of the radially outermost portion 31 of at least one convolution 32 of the coil spring 8. When the damper 1 rotates, one or more convolutions of the coil spring 8 bear upon each of the adjacent slides 30 and urge the smooth external surfaces of such slides toward the internal surfaces 21, 22 of the parts of component 2 defining the arcuate chamber 34. Each coil spring 9 assists the bias of the respective coil spring 8 upon the slides 30.

In the embodiment of FIG. 2, the slides 30 directly abut a wall 33 the inner surface of which is an equivalent of the internal surfaces 21, 22 of the sections 17, 18 of the component 2 in the damper 1 of FIG. 1. However, it is equally within the purview of the invention to cause the coil spring 8 to contact an intermediate layer or coat which is provided on the inner surface of the wall 33 or insert 25. Such layer or coat should exhibit a pronounced resistance to wear which resistance preferably exceeds that of the material of the wall 33. In addition to resistance to wear, or in lieu thereof, the layer or coat should be capable of moving along the slides 30 or vice versa with a minimum of friction. At the same time, or in lieu of the application of a layer or coating to the wall 33, the latter can and preferably should be provided with a film of a suitable lubricant (such as the grease 7 in the chamber of the component 2).

In order to establish a satisfactory film of lubricant between the inner surface of the wall 33 and the peripheral surfaces of the slides 30, at least one of these surfaces should be provided with a precision finish on a material which can readily and reliably retain a film of lubricant (such as grease) for a long period of time. For example, the outer surfaces of the slides 30 and/or the inner surface of the wall 33 can have a certain unevenness or roughness which promotes the retention of a film of lubricant or of a film of a material of the type provided on contacting parts of friction bearings. By way of example, such films can consist of copper, graphite or polytetrafluorethylene.

The slides can be made of a plastic material, for example, in an injection molding machine; this contributes to a low or reasonable cost of such parts.

Figure 4:
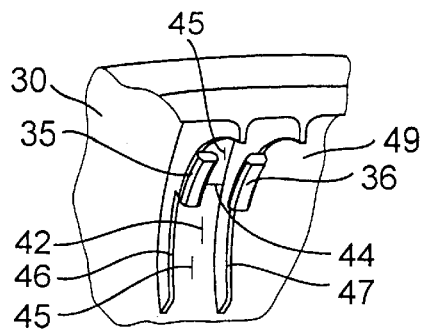
FIG. 4 is a fragmentary perspective view of one of the friction reducing slides shown in FIGS. 2 and 3.
Figure 5:
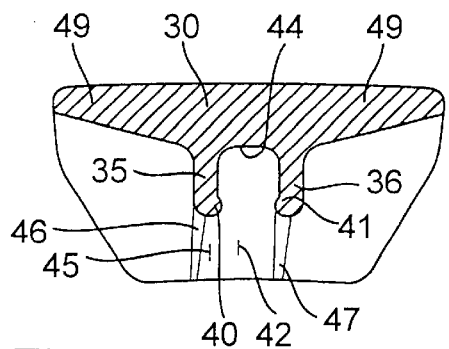
FIG. 5 is a greatly enlarged fragmentary sectional view of one of the slides shown in FIGS. 2 and 3 or of the portion of the slide which is illustrated in FIG. 4.
Figure 6:
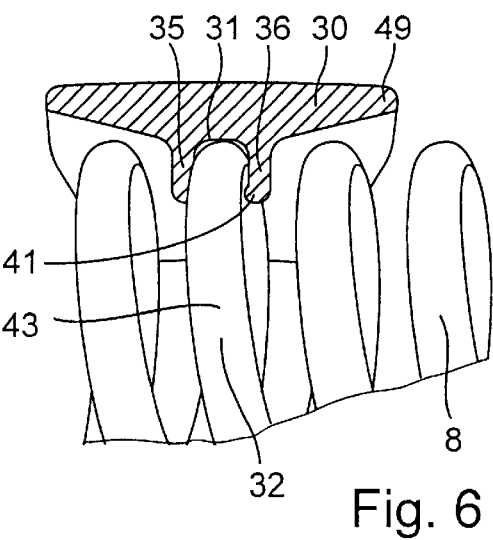
FIG. 6 illustrates the structure of FIG. 5 and the adjacent portion of the coil spring, two neighboring convolutions of the coil spring being clamped to the median part or portion of the slide.

FIGS. 4 to 6 show that the slides 30 can include substantially hook-shaped or claw-shaped portions or sections 35, 36 which extend radially inwardly and clamp parts of or the entire radially outermost portions 31 of the nearest convolutions 32 of the coil spring 8. The thus established form-locking and/or force-locking connections between the slides 30 and the coil spring 8 properly position the slides in at least one of several directions, particularly or preferably longitudinally of the coil spring 8 and/or transversely of the longitudinal axis 37 of such spring.

As best shown in FIGS. 5 and 6, and as already pointed out hereinbefore, the hook-shaped or claw-shaped portions 35, 36 can further serve to ensure a satisfactory form-locking connection between the slides 30 and selected convolutions 32 of the coil spring 8 in a direction radially of the longitudinal axis 37 of the latter, i.e., these specially configurated portions of the slide hold the latter against movements away from and toward the common axis X of the components at least one of which confines the coil spring (it is assumed here that the center of curvature of the axis 37 is located on the axis X). This is desirable and advantageous because the slides 30 can be properly and reliably assembled with the coil spring 8 before the latter is inserted into the annular chamber 34. Such undertaking contributes to lower cost of the entire torsional vibration damper. Additional savings in assembly time can be achieved if each coil spring 8 is precurved, i.e., if the arcuate shape shown in FIG. 2 is imparted to the illustrated coil spring 8 not during but prior to insertion into the annular chamber 34.

Figure 3:
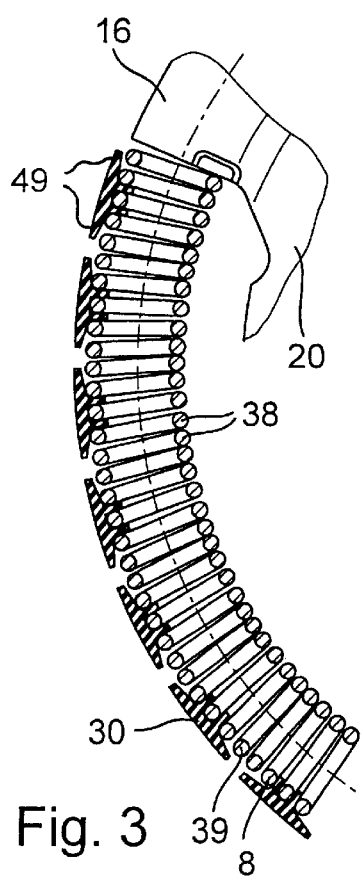
FIG. 3 shows a portion of the structure which is illustrated in FIG. 2 but with the coil spring in nearly fully compressed condition in which the radially innermost portions of neighboring convolutions are in contact or close to being in contact with each other.

In many instances, the length of a coil spring 8 is or can be selected in such a way that it is between 5 and 20 times the outer diameter of one of its convolutions 32. The coil spring 8 of FIGS. 2 and 3 is installed in the chamber 34 of the housing including the components 2 and 3, 20 in such a way that it opposes angular movements of the torque transmitting part (2) relative to the torque receiving part (3, 20) in a direction to move the retainer 16 at one end of the coil spring toward the retainer 14, 15 at the other end of such spring. This moves the radially innermost portions 38 of neighboring convolutions 32 toward and ultimately into actual contact with each other (compare FIGS. 2 and 3). From then on, the coil spring 8 acts as a solid (noncompressible) body which prevents further movements of the retainers 16 and 14, 15 toward each other. This is shown in FIG. 3.

The utilization of an arcuate coil spring 8 further ensures that there is sufficient room in the regions of the radially outermost portions 31 of the convolutions 32 (as seen in the circumferential direction of the convolutions) to avoid squashing of or any other damage to the hook-shaped portions 35, 36 of the slides 30. This can be accomplished by appropriate selection of the round resilient wire 43 (see FIG. 6) of which the coil spring 8 is made, of the outer diameters of the convolutions 32, of the leads or pitches of the convolutions and of the radius of curvature of the coil spring.

It is also advisable to employ a coil spring 8 which is shaped in such a way that the configurations of convolutions 32 which are surrounded by the slides 30 depart from the configurations of convolutions which are disposed between neighboring slides. For example, the convolutions 32 which flank the convolutions within the guides 30 can extend radially outwardly beyond the convolutions within the guides; this can be readily achieved by providing the coil spring 8 with oval convolutions within and/or between the guides 30. Alternatively, all of the convolutions 32 can be round but can include larger-diameter convolutions between and smaller-diameter convolutions within the slides 30.

As clearly shown in FIGS. 2 to 6, each of the illustrated slides 30 further comprises two projections or extensions 49 which act as umbreallas and extend lengthwise of the coil spring 8 in opposite directions starting at the median zone or part 44, namely outwardly from the hook-shaped portions 35, 36. Each of the extensions 49 partially surrounds at least one convolution 32 at the respective side of that convolution which is engaged by the portions 35, 36. The cross-sections of the extensions 49 decrease in directions away from the median zone 44, i.e., away from that region or portion 42 of the slide 30 which is adjacent the radially outer-most portion 31 of the clamped convolution 32, and have substantially wedge-shaped outlines. This ensures that the extensions 49 canot undergo pronounced or excessive deformation such as could result in undesirably pronounced frictional engagement with the wall 33 (i.e., with the component 2) and/or with the adjacent convolutions, even at a high or very high RPM of the torsional vibration damper 1.

The just described positionings, shapes and dimensions of the extensions 49 can ensure that the convolutions 32 which are adjacent the convolution being clamped by the hook-shaped portions 35, 36 cannot contact the slide 30; this, in turn, practically prevents frictional engagement between the slide and the convolutions within the extensions 49 during expansion and/or contraction of the coil spring 8.

As shown in FIGS. 2 and 3, the slides 30 are designed and distributed (lengthwise of the coil spring 8) and their numbers are selected in such a way that they permit the establishment of direct contact between the radially innermost portions 38 of the convolutions 32 but that the neighboring slides do not actually contact each other. This is shown in FIG. 3. The mutual spacing of neighboring slides 30 is preferably such that those portions of the coil spring 8 which are disposed between neighboring slides are sufficiently stiff (as seen radially of the spring) to prevent the establishment of contact between the inner surface of the wall 33 and the radially outermost portions 31 of convolutions 32 disposed between neighboring slides, at least during a major part of the range of revolutions of the torsional vibration damper about its axis X. If the RPM of the damper 1 is very high (e.g., above or well above 4000), a contact between the wall 34 with the convolutions 32 between neighboring slides 30 can take place nevertheless but the forces acting between the wall 33 and the convolutions 32 not being overlapped by the extensions 49 of the slides are relatively small.

Referring again to FIG. 2, the slides 30 at the ends of the coil spring 8 are arranged in such a manner that they are further away from the axis 37 of the coil spring 8 than the intermediate slides. A small number of convolutions 32 (e.g., between two and five) at each end of the coil spring 8 are not coupled or linked to the respective (adjacent) slides 30 so that they are free to move toward or away from each other in the axial direction of the coil spring.

Referring now again to FIGS. 5 and 6, the hook-shaped portions 35, 36 of certain slides 30 can respectively define or include parts 40, 41 which overlap the adjacent radially outermost portions 31 of the respective convolutions 32. The portions 35 and 36 exhibit a certain amount of resiliency or elasticity to facilitate attachment (by clamping action) of the slides 30 to the adjacent convolutions. Thus, in accordance with the present invention, the slides 30 can be secured to the coil spring 8 by snap action in such a way that they cannot become separated from selected convolution(s) 32, e.g., due to an accident, due to an error in assembling of the slides with the coil spring and/or for other reasons even though they are separable from the coil spring, if necessary.

That region or portion (42) of each slide 30 which cooperates with the adjacent portion 31 of the nearest convolution 32, and which includes the hook-shaped portions 35, 36 is preferably designed in such a way that the convolution 32 having its radially outermost portion 31 clamped by the portions 35, 36 has a certain freedom of angular movement with reference to the slide, i.e., it can "tilt" back and forth in response to compression or expansion of the coil spring 8. In other words, changes of orientation of convolutions 32 which take place in response to shortening or lengthening of the coil spring 8 do not necessitate any tilting and/or turning of the slide 30 even though the latter is coupled to a convolution 32 of the coil spring. Such coupling of the parts 8, 30 and such design of the coupling means including the hook-shaped portions 35, 36 of the slide and portion 31 of the convolution coupled to the slide ensures that each slide invariably remains in an optimum orientation relative to the coil spring 8 as well as relative to the wall 33 and that each slide can perform its intended function in an optimal manner. The required tilting angle depends primarily upon the pitch or lead of the convolutions 32. It has been ascertained that the angle of tilting of a slide 30 and the convolution 32 which is coupled thereto is within the range of between about 2° and 10°. However, under certain circumstances, such angle can exceed 10°; in fact, it can be well above 10°.

FIGS. 4 and 5 show that those regions or portions 42 of a slide 30 which are adjacent the nearest convolution 32 of the coil spring 8 can be configured in such a way that they surround the round wire 43 of the convolution not only as seen longitudinally but also as seen circumferentially of the wire. In the embodiment of FIGS. 4 and 5, the hook-shaped portions 35, 36 form part of a median zone 44 of the region or portion 42. That part (45) of the region 42 which is adjacent a side of the median zone 44 includes arcuate rib-shaped portions or projections or raised portions 46 and 47. As considered in the direction of the longitudinal axis 37 of the coil spring 8, the height of each of the arcuate rib-shaped projections or raised portions 46, 47 is less than that of the hook-shaped portion 35 or 36. The parts 45 and the rib-shaped projections 46, 47 which flank the parts 45 are designed in such a way that their clearance or play with respect to the wire 43 of the convolution 32 increases with increasing distance from the median zone 44. Such clearance enables the respective convolution 32 to undergo resilient deformation relative to the slide 30, i.e., its pitch or slope increases without it being necessary to subject the slide to a tilting force. The median zone 44 and/or the associated hook-shaped retaining portions 35, 36 can be designed in such a way that the radially outermost portion 31 of the convolution 32 is received, between the portions 35, 36 with minimal play or with no play at all.

Figure 7:
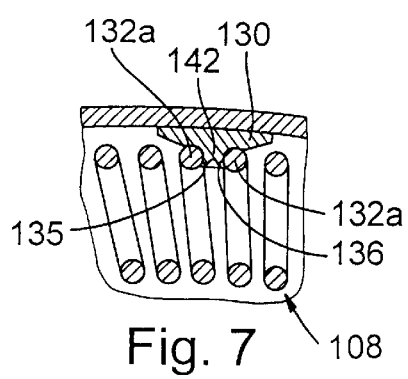
FIG. 7 is a fragmentary sectional view similar to that of FIG. 2 or 3 but showing a modified slide and a portion of the adjacent coil spring.
Figure 8:
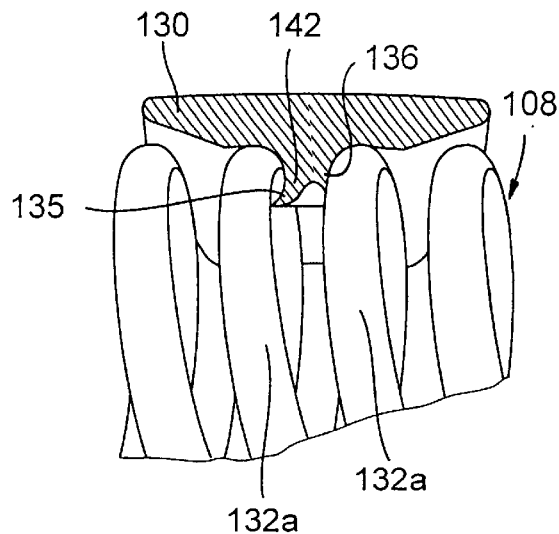
FIG. 8 is an enlarged sectional view of the slide which is shown in FIG. 7 and of several convolutions of the coil spring which is coupled to the slide.

All such parts of the modified slide 130 in the torsional vibration damper embodying the structure of FIGS. 7 and 8 which are identical with or analogous to the corresponding parts of the slide 30 shown in FIGS. 2 to 6 are denoted by similar reference characters plus 100. The slide 130 extends in the direction of the axis of the coil spring 108 which has or can have an arcuate longitudinal axis, the same as the axis 37 shown in FIG. 2. The region or portion 142 of the slide 130 extends between the neighboring convolutions 132a of the coil spring 108 to thus locate the parts 108, 130 relative to each other as seen in the longitudinal direction of the coil spring.

The configuration of the portion 142 of the slide 130 is such that it properly positions the slide in directions transversely of the longitudinal axis of the spring 108. To this end, the portion 142 includes portions or sections 135, 136 which engage (extend beneath) the adjacent convolutions 132a. Thus, it can be said that the portions 135, 136 include widenings or widened parts of the portion 142, as seen in the longitudinal direction of the coil spring 108. Such widenings or widened portions exceed the distance between the neighboring convolutions 132a in unstressed condition of the coil spring 108. This establishes a form-locking connection between the coil spring 108 and the slide 130.

The portions 135, 136 (i.e., the parts which mount the slide 130 on the coil spring 108) can be provided only in the median zone of the segment-shaped arcuate region or portion 142, the same as or similar to that already described and shown with reference to the parts 35, 36 of the slide 30 which is illustrated in FIGS. 4 to 6.

The segment-shaped or arcuate portion 142 of the slide 130 extends between the neighboring convolutions 132a of the coil spring 108 and is preferably designed in such a way that it permits a deformation of the convolutions without it being necessary to subject the slide to a shifting force. This renders it possible to reduce the width (extension) of the portion 142 proportionally with increasing distance from the portions 135, 136.

Figure 9:
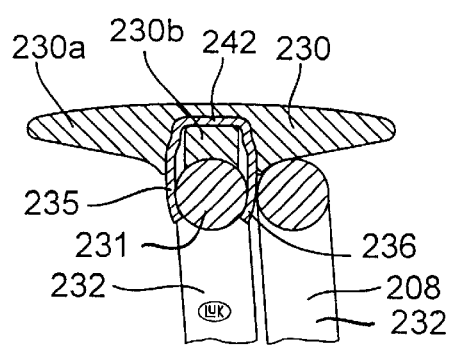
FIG. 9 is a sectional view of a further (two-part) slide and of two convolutions of the coil spring which is clampingly engaged by one of the two parts of the slide.

The slides 30, 130 are constructed in such a way that their anchoring or coupling means (i.e., the portions which couple the slides to the respective coil springs 8, 108) are of one piece with the remaining portions of the slides. On the other hand, FIG. 9 shows a composite slide 230 wherein the means for coupling the shoe or slide 230 to the adjacent convolution or convolutions 232 of the coil spring 208 constitute one or more separately produced parts 242. Each part 242 includes a U-shaped member having two legs 235, 236 which engage the radially outermost part of the adjacent convolution 232 substantially in the same way as shown in FIG. 6 for the parts 35, 36 and the outermost portion 31 of the convolution 32. The separately produced part 242 can be made of spring steel or of a suitable plastic material.

The major portion or part 230a of the slide 230 has a transversely extending rib 230b which carries the separately produced part 242, e.g., by snap action. The rib 230b is or can be obtained by providing the blank of the slide 230 with a suitably configurated slit which converts the blank into two distinct but coherent parts 232a and 232b with room for slipping the U-shaped part 242 onto the rib 230b. The configuration of the illustrated part 242 is such that this part can remain in an optimum position relative to the rib 230b without resorting to any separately produced fastener means. Such retention of the part 242 on the rib-shaped part 230b is ensured by resorting to a clamping action analogous to that of a snap fastener or clip. It is also possible to employ a resilient snap fastener or clip which can resemble the part 242 and the legs 235, 236 and is partially embedded in the preferably plastic material of the main portion or part 230a of the slide 230, e.g., in an injection molding machine.

The present invention can be embodied with particular advantage in so-called dual or twin mass flywheels. Such flywheels are disclosed, for example, in published German patent applications Nos. 4 117 582, 4 214 655, 4 414 584, 4 420 927 and 195 222 718 to which reference may be had, if necessary. However, the incorporation or utilization of the improved torsional vibration damper into or in a composite flywheel is but one of numerous applications of the improved damper and of its slide(s). Such damper can be set up in any machine or the like wherein two or more relatively turnable components con-fine and turn against the opposition of one or more coil springs. Typical examples of arrangements in which the improved torsional vibration damper can be put to use are friction clutches and/or clutch discs or clutch plates operating between the pressure plates of a friction clutch and the input shaft of the change-speed transmission in the power train of a motor vehicle. The improved damper can be utilized with equal or similar advantage in the pulleys or sheaves of so-called CVT transmissions wherein belts, chains or other endless flexible torque transmitting elements are trained over pulleys which are adjustable to change the ratios of such transmissions. An advantage of the improved torsional vibration dampers is that they are practically noiseless, even at a very high RPM of the machine (such as a motor or a gearing) which drives the components of the damper.

The improved damper can employ simple or composite energy storing units which comprise one or more coil springs or equivalent resilient elements. Plural coil springs (such as 8 and 9) can operate in series or in parallel (see FIG. 1). Reference may be had to the aforementioned copending patent application Ser. No. 10/094,503 filed Mar. 8, 2002 by Jackel et al. This copending application discloses and shows plural coil springs which are disposed end-to-end and plural coil springs which are confined in each other. Reference may also be had to published German patent applications Nos. 4 229 416, 4 406 826, 196 03 248, 196 48 342, 199 09 044 and 199 12 970 which disclose energy storing units having resilient elements capable of cooperating with slides that embody one or more features of the present invention.

An important advantage of the improved torsional vibration damper, and more specifically of the novel connection between a slide 30, 130 or 230 one the one hand and at least one convolution 32, 132a or 232 on the other hand, is that the slide is properly positioned and remains in proper position relative to the coil spring and cannot be accidentally separated therefrom. This also brings about numerous additional advantages, such as convenient assembly of a coil spring with one or more slides prior to insertion of the coil spring into the chamber which is defined by one or more relatively turnable components of the improved torsional vibration damper. Thus, each coil spring can be assembled with one or more slides at the plant which produces the coil springs.

Another important advantage of the improved damper is that the convolution or convolutions which are coupled to a slide have a certain freedom of pivotal movement relative to the slide. This enables the clamped convolution(s) to pivot relative to the slide in response to expansion and contraction of the coil spring, and such pivoting of the convolution(s) can take place without subjecting the slide to excessive (deforming, turning and/or braking) stresses.

It is presently preferred to make the slides of a suitable plastic material (e.g., in an injection molding machine). This holds true when the slides (such as 30 or 130) are of one piece as well as when the slides (230) are assembled of a plurality of discrete (separately produced) parts. Embedding of separately produced U-shaped or analogous parts (242) into plastic main parts (230a) of composite slides (230) can contribute to the strength of the thus obtained composite slides as well as to even more satisfactory (more reliable) form-locking and/or force-locking engagement between the prongs or legs (235, 236) of the second part (242) and the radially outermost portion (231) of the clamped convolution (232). As already mentioned above, the second part 242 of a composite slide 230 can be made of spring steel or of a suitable plastic material which exhibits the required strength, durability, resiliency and/or other desirable characteristics.

By causing a slide to surround the adjacent portion of at least one convolution along an angle of not less than 90°, preferably or often at least 180°, one ensures that the slide is reliably secured to the coil spring (such as the coil spring 8 of FIGS. 2 and 3) against radially outward movement away from the axis 37 of the coil spring. Such form-locking connection can be readily established by resorting to arcuate portions 35, 36 which are made of a resilient material permitting temporary deformation of the portions 35, 36 for the purpose of connecting them to the portion 31 of the adjacent convolution 32 by snap action.

FIGS. 2 and 3 further show that a relatively long coil spring 8 can carry two or more discrete slides 30 which preferably remain spaced apart from each other even when the radially innermost portions 38 of neighboring convolutions 32 contact each other (see FIG. 3). The end convolutions 32 of the coil spring 8 can extend outwardly beyond the outermost slides 30 to thus ensure that the outermost slides cannot interfere with the deformation of such outermost convolutions by the retainer 16 and/or 14, 15.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration dampers for use in the power trains of motor vehicles and the like and, therefore, such adaptations should and are intended to be comprehended within the meaning and range of equivalence of the appended claims.

What is claimed is:

1. A torsional vibration damper, comprising:
a first component rotatable about a predetermined axis;
a second component rotatable about said axis with and relative to said first component, at least one of said components defining an arcuate chamber bounded by an internal surface of said at least one component;
at least one energy storing unit including an elongated coil spring disposed in said chamber and arranged to oppose rotation of said components relative to each other, said at least one coil spring having a plurality of convolutions, a first end bearing upon a retainer of said first component, a second end reacting against a retainer of said second component, and an intermediate portion between said ends thereof, said at least one component including a wall having an inner surface forming part of said internal surface, disposed radially outwardly of said at least one coil spring and extending circumferentially of the coil spring at least between said ends thereof; and
friction reducing means including at least one slide interposed between said inner surface and said coil spring, said slide having an outer side adjacent said inner surface and overlying at least one convolution of said at least one coil spring, said at least one convolution having a radially outermost portion nearest to said inner surface and said slide including at least one portion engaging at least a part of said outermost portion of said at least one convolution to thus (a) prevent movements of said slide and said at least one convolution relative to each other longitudinally of said coil spring and (b) oppose movements of said slide and said at least one convolution relative to each other at least substantially radially of said axis, wherein said at least one portion of said slide is coupled to said at least one coil spring in such a way that said slide is constrained relative to said at least one coil spring in a direction perpendicular to a longitudinal axis of said at least one coil spring.

2. The damper of claim 1, wherein said components form part of a power train in a motor vehicle.

3. The damper of claim 1, wherein said at least one portion of said slide is in form-locking engagement with said part of said outermost portion of said at least one convolution.

4. The damper of claim 1, wherein said at least one portion of said slide is in force-locking engagement with said part of said outermost portion of said at least one convolution.

5. The damper of claim 1, wherein said at least one portion of said slide is in force-locking and form-locking engagement with said part of said outermost portion of said at least one convolution.

6. The damper of claim 1, wherein said at least one portion of said slide engages said part of said outermost portion of said at least one convolution of said coil spring to thus oppose said movements of said slide and said at least one convolution substantially radially of said axis.

7. The damper of claim 1, wherein said portion of said slide is arranged to engage said at least one convoution of said coil spring with limited freedom of pivotal movement of said at least one convolution of said coil spring relative to said slide.

8. The damper of claim 7, wherein the extent of said pivotal movement is between about 2° and 10°.

9. The damper of claim 1, wherein said at least one convolution consists of round wire and said portion of said slide partially surrounds and also extends lengthwise of the wire of said at least one convolution.

10. The damper of claim 9, wherein said portion of said slide includes a median part which contacts the wire without appreciable play and two outer parts surrounding the wire with plays which increase in directions lengthwise of the wire and away from said median part.

11. The damper of claim 1, wherein said slide further comprises at least one extension projecting from said at least one portion thereof and lengthwise of the coil spring.

12. The damper of claim 11, wherein the cross-sectional area of said at least one extension decreases with increasing distance from said at least one portion of said slide.

13. The damper of claim 11, wherein said at least one extension has an at least substantially wedge-shaped cross-sectional outline.

14. The damper of claim 1, wherein said slide further comprises first and second extensions flanking said at least one portion of said slide and extending lengthwise of the coil spring toward the first and second ends of the coil spring, respectively.

15. The damper of claim 14, wherein the cross-sectional areas of said extensions decrease with increasing distances from said at least one portion of said slide.

16. The damper of claim 14, wherein each of said extensions has an at least substantially wedge-shaped cross-sectional outline.

17. The damper of claim 1, wherein said at least one slide is of one piece.

18. The damper of claim 1, wherein said at least one slide further includes a main part and said at least one portion of said slide includes a separately produced second part affixed to said main part.

19. The damper of claim 18, wherein said second part is at least substantially U-shaped and includes two legs clamping said part of said outermost portion of said at least one convolution.

20. The damper of claim 18, wherein said second part of said slide consists, at least in part, of spring steel.

21. The damper of claim 18, wherein said second part of said slide includes means for securing said portion of said slide to said at least one convolution by snap action.

22. The damper of claim 1, wherein said slide has an arcuate shape and overlies a portion of said coil spring including said at least one convolution.

23. The damper of claim 1, wherein said slide is at least substantially U-shaped and overlies a portion of said coil spring including said at least one convolution.

24. The damper of claim 1, wherein said slide surrounds a portion of said coil spring along an arc of at least 90°, as seen lengthwise of said at least one convolution.

25. The damper of claim 1, wherein said slide surrounds a portion of said coil spring along an arc of at least 180°, as seen lengthwise of said at least one convolution.

26. The damper of claim 1, wherein said coil spring extends along an arc of at least 90°.

27. The damper of claim 1, wherein said friction reducing means includes a plurality of discrete slides.

28. The damper of claim 1, wherein said components constitute discrete flywheels of a composite fly-wheel.

29. The damper of claim 28, wherein one of said components is arranged to receive torque from a prime mover of a power train in a motor vehicle and another of said components is arranged to transmit torque to a rotary input element of a change-speed transmission in the power train.

30. The damper of claim 29, wherein said chamber is a circumferentially complete annular chamber and further comprising at least one second energy storing unit in aid chamber.

31. The damper of claim 3, wherein said form-locking engagement is formed by a snap connection.

* * * * *